United States Patent
Bracegirdle

(10) Patent No.: US 7,563,017 B1
(45) Date of Patent: *__Jul. 21, 2009__

(54) PROCESS FOR MIXING CONGEALABLE MATERIALS SUCH AS CEMENT, ASPHALT, AND GLUE WITH FIBERS FROM WASTE CARPET

(76) Inventor: Paul E. Bracegirdle, 9 Crimson Leaf Dr., Newtown, PA (US) 18940

( * ) Notice: Subject to any disclaimer, the term of this patent is extended or adjusted under 35 U.S.C. 154(b) by 621 days.

This patent is subject to a terminal disclaimer.

(21) Appl. No.: 11/188,522

(22) Filed: Jul. 25, 2005

Related U.S. Application Data

(63) Continuation-in-part of application No. 10/641,410, filed on Aug. 15, 2003, now Pat. No. 6,971,784.

(60) Provisional application No. 60/408,764, filed on Sep. 6, 2002.

(51) Int. Cl.
*B28C 5/40* (2006.01)

(52) U.S. Cl. .............................. 366/7; 366/6

(58) Field of Classification Search ............... 366/1–2, 366/4, 6–8, 22–25
See application file for complete search history.

(56) References Cited

U.S. PATENT DOCUMENTS

| | | | | |
|---|---|---|---|---|
| 3,885,774 A * | 5/1975 | Harris et al. | | 366/20 |
| 3,895,781 A * | 7/1975 | Lodige et al. | | 366/165.2 |
| 4,092,737 A * | 5/1978 | Sandell | | 366/3 |
| 4,316,671 A * | 2/1982 | Christen et al. | | 366/192 |
| 4,527,902 A * | 7/1985 | Christen | | 366/170.4 |
| 4,662,759 A * | 5/1987 | Leibee et al. | | 366/2 |
| 4,706,893 A * | 11/1987 | Brock | | 241/23 |
| 4,887,908 A * | 12/1989 | Montgomery et al. | | 366/149 |
| 4,955,721 A * | 9/1990 | Clark et al. | | 366/24 |
| 5,018,673 A * | 5/1991 | Eirich et al. | | 241/62 |
| 5,028,266 A * | 7/1991 | Rettenmaier | | 106/282 |
| 5,224,774 A * | 7/1993 | Valle et al. | | 366/2 |
| 5,407,139 A * | 4/1995 | Mleczewski | | 241/18 |
| 5,590,976 A * | 1/1997 | Kilheffer et al. | | 404/72 |
| 6,183,123 B1 * | 2/2001 | Sniegowski et al. | | 366/8 |
| 6,527,430 B2 * | 3/2003 | Osborn | | 366/97 |
| 6,554,465 B2 * | 4/2003 | Cruso | | 366/3 |
| 6,780,367 B2 * | 8/2004 | Pyzik et al. | | 264/333 |
| 6,786,988 B1 * | 9/2004 | Bell | | |
| 6,843,592 B2 * | 1/2005 | Taylor et al. | | 366/18 |
| 6,971,784 B1 * | 12/2005 | Bracegirdle | | 366/7 |
| 2002/0101779 A1 * | 8/2002 | Cruso | | 366/30 |
| 2006/0087910 A1 * | 4/2006 | Knepp | | 366/1 |
| 2007/0271877 A1 * | 11/2007 | Sebille | | 366/8 |
| 2008/0101150 A1 * | 5/2008 | George et al. | | 366/8 |

FOREIGN PATENT DOCUMENTS

| | | |
|---|---|---|
| DE | 3927252 A1 * | 2/1991 |
| DE | 4244559 A1 * | 7/1994 |

(Continued)

*Primary Examiner*—Charles E Cooley
(74) *Attorney, Agent, or Firm*—LaMorte & Associates

(57) ABSTRACT

A process for making reformed fiber from waste carpet material including separating into their individual strands, in well-graded lengths by mechanically disrupting, milling and granulating the waste carpet material and a further process for inserting and uniformly distributing such fibers throughout congealable materials such as asphalt and concrete, thereby providing improved physical properties to the resultant solids.

8 Claims, 2 Drawing Sheets

| FOREIGN PATENT DOCUMENTS | | | |
|---|---|---|---|
| EP | 499572 A1 * | 8/1992 | |
| EP | 509893 A1 * | 10/1992 | |
| FR | 2682308 A1 * | 4/1993 | |
| FR | 2814979 * | 4/2002 | |
| GB | 2098497 A * | 11/1982 | |
| JP | 2002187124 A * | 7/2002 | |
| WO | 95/09723 * | 4/1995 | |
| WO | 02/09861 A1 * | 2/2002 | |
| WO | WO 02083590 A2 * | 10/2002 | |
| WO | WO 2006054929 A1 * | 5/2006 | |
| WO | 2008/122371 * | 10/2008 | |

* cited by examiner

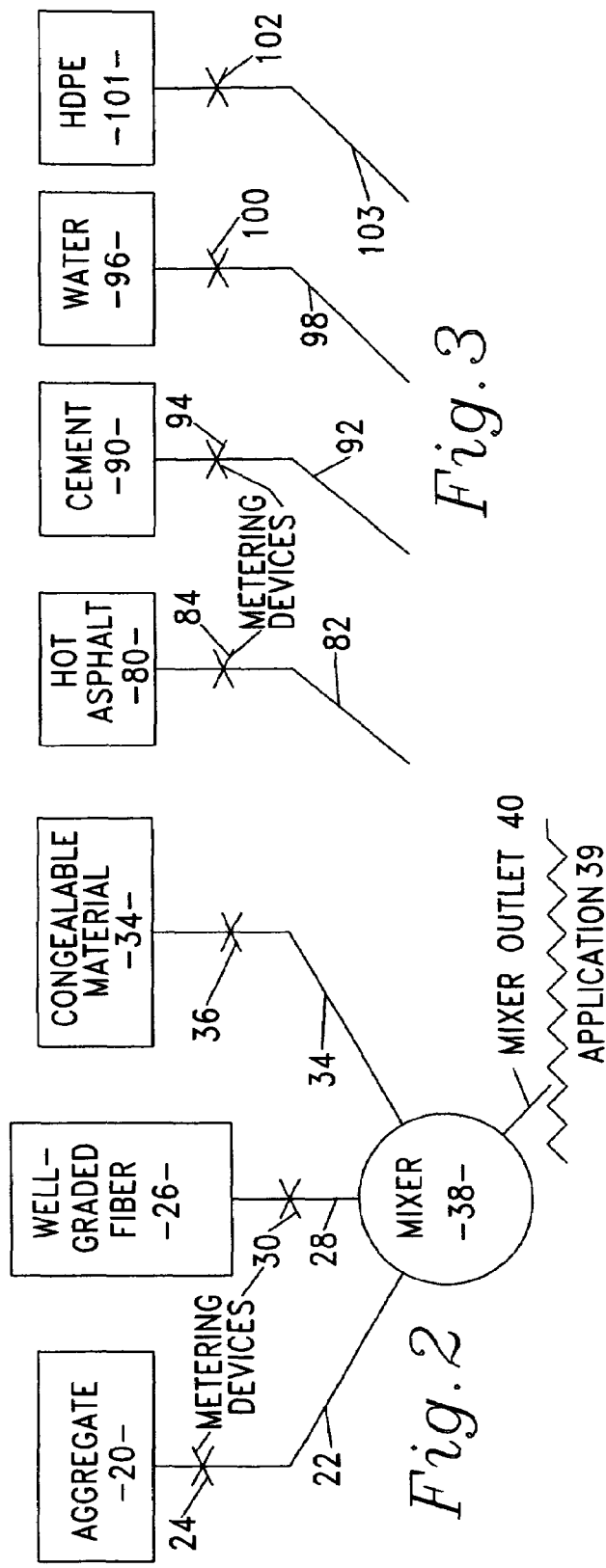
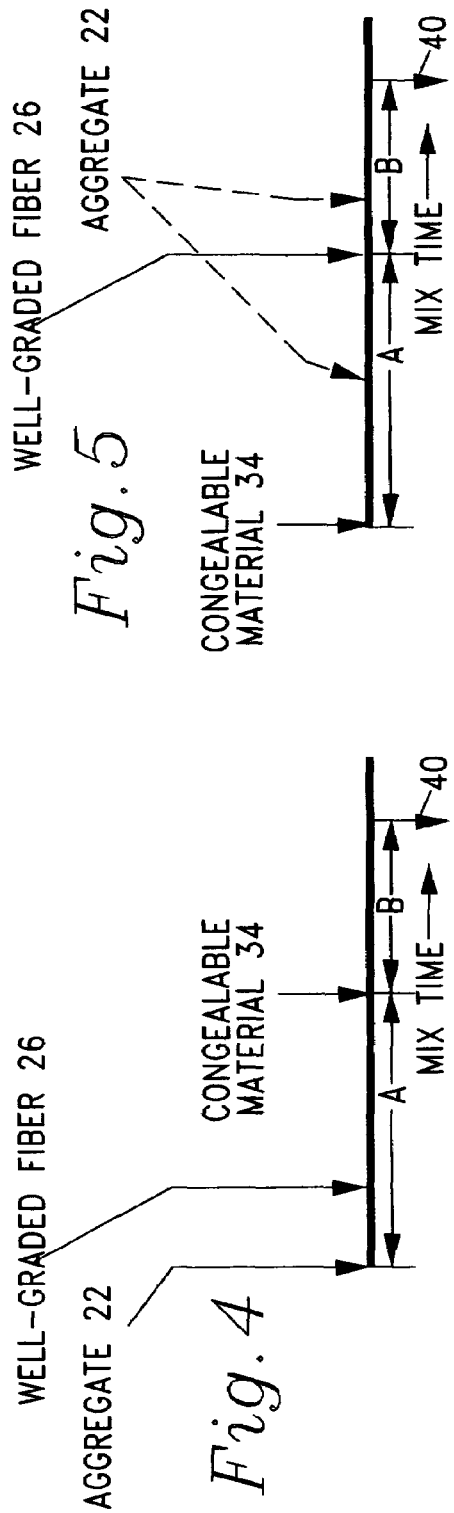

PROCESS FOR MIXING CONGEALABLE MATERIALS SUCH AS CEMENT, ASPHALT, AND GLUE WITH FIBERS FROM WASTE CARPET

CROSS REFERENCE TO RELATED APPLICATIONS

This application is a Continuation-in-Part of Utility patent application bearing Ser. No. 10/641,410 filed Aug. 15, 2003, now U.S. Pat. No. 6,971,784 B1 and on Provisional patent application bearing Ser. No. 60/408,764 filed Sep. 6, 2002.

FEDERALLY SPONSORED RESEARCH

Not applicable

SEQUENCE LISTING OR PROGRAM

Not applicable

BACKGROUND OF THE INVENTION

1. Field of the Invention

This invention relates to and teaches processes for making reformed or well-graded fiber made from waste carpet materials. The invention further teaches the use of such fibers for improving cementitous structures such as concrete roadbeds and concrete beams, piers, statuary and other cementitous structural elements. The invention also discloses processes for employing the reformed fibers for improving the static and dynamic physical properties of structural entities such as hot-mix asphalt roadbeds. The invention further teaches the use of well-graded fibers for reinforcing other congealable materials including plastics and glues and laminates employing one or both.

Effect of Waste Carpet on the Environment:

Thousands of tons of carpeting are annually removed from offices and homes and discarded in landfills. Many of these carpets are fabricated from man-made fibers such as Nylon (TM Dupont Co.), polypropylene and similar materials. These materials are not biodegradable and therefore never decay or undergo any of the biological degradation processes. Further, the carpeting sheds water and thereby prevents water from reaching and decaying degradable materials underneath.

Economics

The beneficial use of waste carpet instead of disposal in landfill provides an immediate important economic benefit. Other benefits arise from improvements in the static and dynamic physical properties of structural, construction and road surfacing materials. These economic benefits are related to the longer life of the products and the road surfaces arising from their improved resistance to cracking, the reduced annual costs for maintenance and replacement and the avoidance of economic loss arising from replacement and other costs that occur during the periods required for repair and replacement. Cementitous structures employing reformed or well-graded fibers can have lighter weight and thinner sections that use less Portland cement. Further, Portland cement production is a significant contributor to atmospheric carbon dioxide pollution. By contrast, such structures formed from prior art fibers that are of substantially uniform length (gap-graded) impart significantly less improvement in physical properties. Glue bound laminates formed with well-graded fibers have higher moduli and therefore are stiffer and require thinner sections or can offer longer spans. Typical congealable glues are cyanoacrylates, epoxies, heat or ultra violet curables, hot melt types, foams and various industrial adhesives 2. Prior Art The use of high quality fibers, such as Nylon™, for reinforcing cementitous or asphaltic structures has been limited for three reasons. First has been the relatively high cost of Nylon. Virgin Nylon fiber in 2005 costs about $1.00 per pound. Second is the difficulty of handling, feeding and mixing loose, virgin fibers into either hot asphalt liquid or into cementitous mix prior to their application. Third is the fact that physical property improvements imparted to the hot-mix asphalt or cementitous structural materials which result from the use of high quality fibers that are similar in length has been disappointingly small.

Asphalt Current Usage

A typical road construction product of hot-mix asphalt has about 93% aggregate of stones, sand and recycled waste materials. Typically six percent (6%) by weight of the final mixture is the liquid asphalt binder. Where fibers are specified, polyester is used at the rate of 6 pounds fiber per ton of total mix or 5% by weight of the liquid asphalt. Polyester fiber is supplied in bags as a pre-weighed, loose, fluffy bulk material.

One manufacturer has developed a process for recycling the material in waste carpets by 'ginning' the carpet fibers. His process produces so-called "gap-graded" fibers that are substantially the same length. The fibers so produced are curly and feed poorly into processes. To improve feeding and flow of the fibers, the manufacturer reassembles the extracted Nylon fibers in small pellets bound together by the polypropylene carpet component. These pellets have been used to add fiber to asphaltic compositions by virtue of the ease with which the pellets can be measured and fed into the mix. Also, while this process incurs an expense, the resulting pellets are considered suitable landfill material since the pellets do not impede moisture flow within the landfill, even though the pellets themselves do not biologically degrade. Further, the calcium carbonate backing material is lost and discarded.

Concrete Current Usage:

A typical road, cast statuary, building beams or other structural element or foundation employing Portland cement concrete has about 85% aggregate of stones and sand with only about 15% of the concrete mix being the Portland cement or other cementitous binder and water. Steel and other fiber binders have been experimentally used in Portland cement concrete and other cementitous products to improve their physical properties. Typical fiber concentrations that have been employed in fiber reinforced concretes range from 2 to 5 pounds polyester or polyolefin fiber per cubic yard finished concrete.

Fiber binders are known to have been used in thermally or chemically hardening materials to improve their strength, flexibility and resistance to cracking. The State of Ohio publishes Standard #400HS titled, "Standard Specification for Asphalt Concrete—High Stress using Polypropylene Fibers." The use of fiber bearing Acrylic Fill for coating tennis courts is promoted by Vance Brothers, Inc. of Kansas City, Mo. 3M has published an advertising piece reporting on the use of its polyolefin fibers as reinforcement in Portland cement concrete installed on a stretch of U.S. Highway #83 bridge structure over highway I-90 South of Pierre, S. Dak. No method for applying the fibers is taught.

U.S. Pat. No. 5,028,266 by Stephen Rettenmaier teaches the use of 'granulates' comprising cellulose fibers held together by bitumen or other petroleum product that dissolve in hot petroleum asphalt. A mix of equal weights of the fibers and the bitumen are extruded and chopped into lengths or granules. Rettenmaier relies on the heat and solvent action of the hot asphalt to disrupt his granules. Rettenmaier does not teach the use of his 'granulates' in Portland cement concrete.

Waste Nylon carpets have been a potential resource for reinforcing fibers since the carpets contain about 50% Nylon fiber, 10% polypropylene used in the backing along with styrene-butadiene polymer and calcium carbonate.

Prior carpet reclaiming processes yielded a fluffy, curly, twisted fiber that was primarily gap-graded, is difficult to handle, difficult to dispense reliably and accurately and subsequently provided disappointing reinforcement value.

OBJECTS AND ADVANTAGES

The processes disclosed and taught herein provide important environmental and economic advantages through the application of fibers extracted from waste carpet and properly modified to significantly improve congealable construction materials. Specific advantages and objects are:

a. To reform whole waste carpet including the carpet fiber and backing materials by cleaning, chopping, shredding, grinding and/or granulating the whole waste carpet to a level of well-graded fiber lengths of individual filaments including a well-graded mineral portion of the mineral backing. Well-graded fiber means having a wide range of fiber lengths. Well-graded mineral means having a wide range of particle sizes.

b. To employ well-graded or reformed fiber extracted from carpet as a reinforcing element in products formed from congealable constituents.

c. To employ the well-graded fiber extracted from carpet as a reinforcing element in products formed from hot asphalt;

d. To employ the well-graded fiber extracted from carpet as a reinforcing element in products formed from cementitious congealable materials;

e. To employ the well-graded fibers extracted from carpet as a reinforcing element in products produced from other congealable materials.

f. To improve the accuracy of dispensing or metering fibers into the processes by the use of well-graded fibers;

g. To employ well-graded granular material such as the calcium carbonate in carpet associated with the well-graded fibers from carpet to supplement aggregate ordinarily used in products employing cementitious or asphalt as congealable materials;

h. In aggregate bearing products, to secure improvement in the distribution of the reformed fibers through congealable materials by mixing the well-graded fibers first with the aggregate;

i. In aggregate bearing products, to secure improvement in the distribution of the reformed fibers through the congealable materials by mixing the reformed fibers first with the congealable material;

j. In aggregate bearing products, to secure improvement in distribution of the reformed fiber by adding such fibers to a mixture of congealable material and aggregate.

Other objects and advantages will be evident as the processes and their details are disclosed.

SUMMARY OF THE INVENTION

A multi-step process for making and providing well-graded carpet fiber reinforcement for congealable materials including but not limited to asphalt and Portland cement plus water, or the like. The processes includes the steps of cleaning, shredding and granulating the carpet to secure well-graded fiber lengths and a well-graded granular mineral aggregate adjuvant, generally calcium carbonate from the carpet backing, and mixing the well-graded fiber with the congealable material.

BRIEF DESCRIPTION OF THE DRAWINGS

FIG. 2 shows a mixer with inputs of fiber, aggregate and congealable material.

FIG. 3 displays a variety of congealable materials for input to mixer.

FIG. 4 shows a timeline displaying one typical scenario for dispensing aggregate, well-graded fiber and congealable material to the mixer FIG. 5 shows a timeline with generalized ingredient dispensing times to the mixer.

PREFACE TO DETAILED DESCRIPTION OF THE INVENTION

Figure 1:
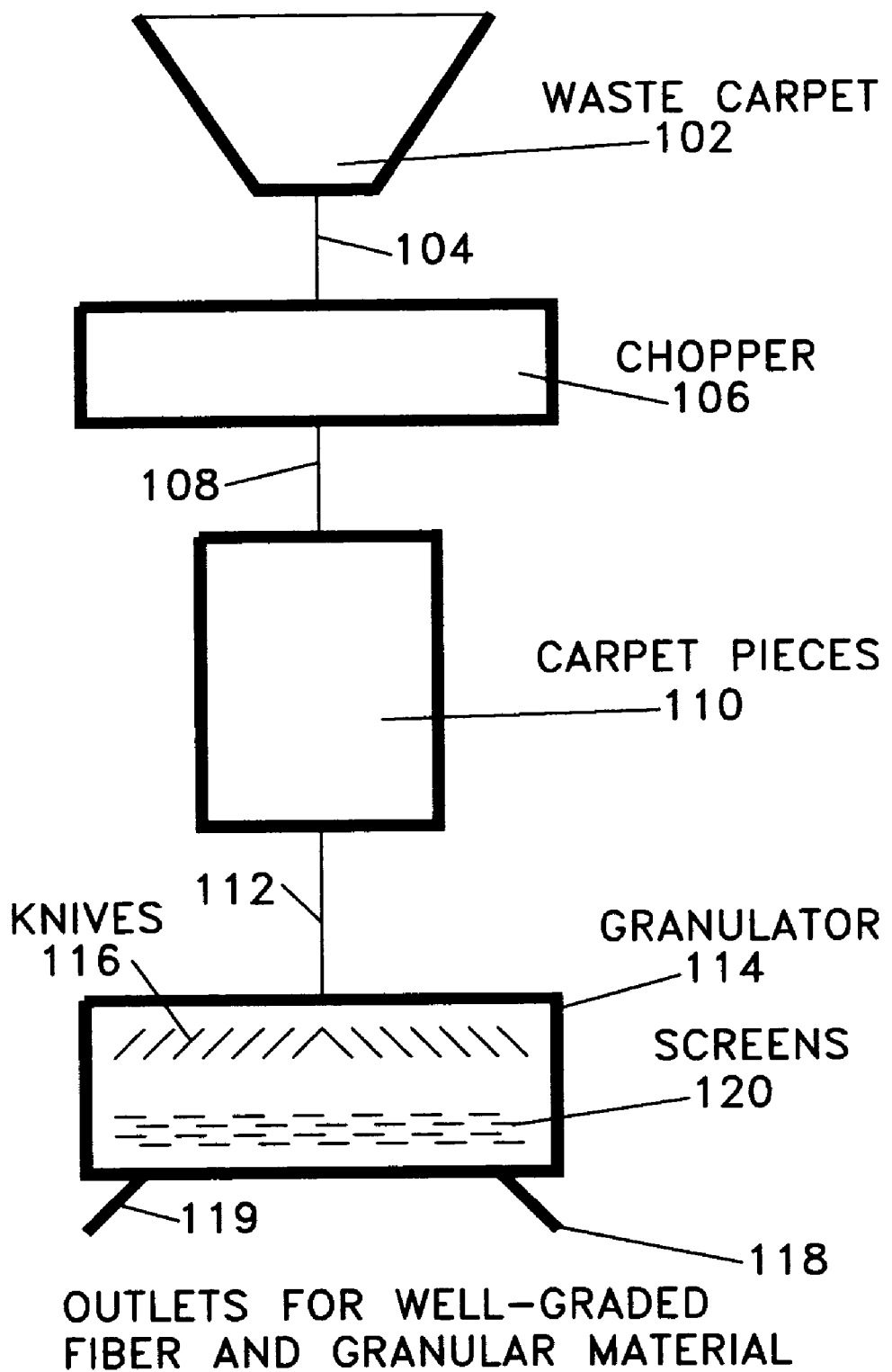
FIG. 1 displays a process for producing well-graded fiber from carpet.

The fiber formed from waste carpet by the clean-chop-granulate process assures that the fibers have a wide range of lengths (well-graded) and that the material formed from the carpet mineral backing (primarily calcium carbonate) comprises fine well-graded particles.

Laboratory tests provide the following data of compressive strength in psi showing the effect of well-graded fiber on concrete strength and on potential reductions in the amounts of cement without loss of properties.

| Constant Cement | | PSI | |
|---|---|---|---|
| MIX | Cement (lb./cu yd) | 24 Hr. | 28 Day |
| Control | 750 | 3460 | 7417 |
| 1% W-G Fiber | 750 | 4473 | 9213 |
| 2% W-G Fiber | 750 | 4153 | 8480 |
| 3% W-G Fiber | 750 | 3927 | 8320 |

| Reduced Cement Content | | | | | ASTM Std C-72 |
|---|---|---|---|---|---|
| MIX | Cement (lb./cy) | 24 hr | 7 day | 28 day | Beam (lb.) |
| Control | 750 | 1510 | 3450 | 7310 | 4000 |
| 1% W-G Fiber | 700 | 1777 | 4660 | 7920 | 7000 |
| 1% W-G Fiber | 675 | 1483 | 4193 | 7520 | 6000 |
| 1% W-G Fiber | 650 | 1323 | 4287 | 7730 | 5500 |

In all cases fiber is given as a percent of cement weight

The first table (Constant Cement) shows almost 25% increase in 28 day compressive strength with only 1% well-graded fiber added.

The second table (Reduced Cement) shows a strength increase of almost 6% with as much as a 13% reduction in cement usage and still exhibiting a 37% increase in beam strength.

A sample of the source carpet weighs in the range of 16-26 lb./cubic foot and has an average composition of Nylon fiber 45%; polypropylene 10% styrene-butadiene polymer 9% and calcium carbonate 36%. The polypropylene melts at about 320 F while the Nylon melts in the range of 530-540 F. Analysis of the reformed fibers within the fiber matrix extracted from this carpet shows fiber lengths from 0.1 mm to 5 mm. Analysis of the minerals from the carpet backing show them to be finely sized and well graded generally between a #10 mesh size and #400 mesh size.

While the making of concrete from powders that congeal or set when combined with water is old, the sources of the powders have evolved from powders produced only by the burning or calcining of limestone (including Greek Statuary) to the use of pulverized coal ash and other materials as cementitious ingredients, thereby lowering the cost of the product and minimizing the volume otherwise occupied by the ash or other materials in landfills or their historical equivalents. Therefore, the term cement powder employed herein is intended to apply to powders or slurries of powders that, when mixed with water, harden to a useful degree. These powders could be limestone, cement, coal ash or a mixture of these or none of these with or without other ingredients that are deemed economically or mechanically useful in the mix.

The process for producing aggregates almost always produces a mixture of coarse and fine aggregates. It is intended that fine aggregates may include sand or other fine materials. It is not otherwise the intention of this specification to specify the dividing size between fine and coarse aggregates or to specify their relative proportions in the concrete mix since these ratios depend on the applications.

Since it is a primary objective of the invention to employ reformed or well-graded waste carpet fiber in loose, bagged, shaped, packaged, pellet or any deliverable form in the described processes, it must be understood that the manufacture, transportation and storage of the reformed fibers will almost always cause some free, non-reformed fiber to be mixed in with the bulk of the reformed fiber. Therefore the use of the terms formed or reformed carpet fibers, loose fibers or fiber pellets or some other reference to fiber or fiber pellets may be understood to sometimes include a percentage of loose or non-reformed fibers. In some cases it may be advisable to use a portion of reformed fibers in pellet or loose form whose source may be other than carpets as long as the majority of the fibers is reformed to be well-graded in size and length including the minerals from the waste carpet.

This specification is not intended to provide specific formulae or ingredient ratios. It is generally intended that standard ingredient ratios as defined in concrete handbooks be employed. However, in order to meet strength, slump, durability and other standard requirements, some variation in component ratios including the use of admixtures may be necessary.

DEFINITIONS

Reformed Fiber or Well-Graded Fiber means the product or output of a mixture of fibers of synthetic fiber carpet having typical properties as follows:

Compositions in the ranges of polypropylene 10%, Nylon™ 45% and other fibers including styrene-butadiene polymer 9%;

Fiber lengths ranging from 0.1 mm to about 5 mm. Well-Graded means fibers and particles that pass screens from #4 down to #400 mesh. Such a Well-Graded Composition is typically formed by subjecting the waste carpet to the following steps:

1. Cleaning the waste carpet by agitating or beating it to loosen and shake out and remove particulate and waste materials that may have soiled or otherwise contaminated the carpet.

2. Shredding the carpet by subjecting it to a series of shredding knives or cutters that produce an output of carpet pieces in the range of about 4 inches to ⅜ inches.

3. Granulating the pieces formed in step 2 by subjecting them to rotating knives or milling and screening to allow passage of both loose fiber of all lengths and particulate matter such as calcium carbonate mineral backing that was used in carpet manufacture. Granulating machines for performing these functions are made by Franklin Miller as Destrux-III or by Rapid Granulator as Storm and by others.

4. While the bulk of reformed fiber is expected to have its source in waste carpets having a high percentage of synthetic fibers and inorganic particulate material, fiber from other sources, including organic sources may be of use in certain applications where the shorter lifetimes of organic materials can be tolerated or special characteristics of metallic fibers are required. Among these potential sources are waste textiles or non-waste materials including steel or stainless steel fibers or fibers from natural sources such as cotton, wool, jute, wood, cellulose or hemp.

Gap-Graded as contrasted with well-graded means that fiber of substantially one length is employed. In cementitous or asphalt applications, gap-graded aggregate, referring to aggregate of substantially one size, is employed to secure a specific surface appearance or structure. Gap-graded aggregate produces concrete or asphalt of reduced strength.

The use of the term 'cement' or 'cement powder', is intended to refer to cement powder including Portland Cement powder or cementitious powders from other sources.

The term 'source' is intended to be any stock of material. A source may be in the form of a mound or pile or in the form of material held in a container or vessel or railcar or truck. FIGS. 1, 2 and 3 display the sources of the various materials such as aggregate 20, fiber 26 and hot liquid asphalt 80. The numbers of the outlet conduits for each such as aggregate 22 and hot asphalt 82 are sometimes employed to designate both the dispensing step and the related source.

The term 'dispense' is intended to refer to delivery of material to the process in any manner or in any form.

The term 'conduit' as employed herein is intended to refer to any means of transferring material from one place to another.

A metering or flow control device or process step is intended to refer to and include any means of controlling, measuring or estimating the amount transferred. Such a device may be a flow control valve or a measured volume, including, for instance, the volume of a bucket of a back hoe or a bin gate.

A congealable material is any material that is initially flowable or mixable including powders and liquids, that hardens after a time or after mixing with water or after exposure to a process such as heating, cooling or exposure to other process means.

DETAILED DESCRIPTION OF THE INVENTION

FIG. 1 displays a preferred process for producing the well-graded fibers employed in the process of the invention. A source of cleaned waste carpet 102 is conveyed by some means 104 to a chopper 106 that chops the carpet into pieces typically ranging in size from about 2×2 inches to 8×8 inches. These pieces are conveyed via some means 108 to a storage and feed point 110 where they can be conveniently fed to granulator 114 via some means 112. The granulator comprises a series of high speed knives 116 or an equivalent mill that deconstructs the carpet pieces into their constituent fibers and mills the fibers in a random fashion so that the fibers passing the screens 120 have a wide variety of lengths, thereby being well-graded. The well-graded fibers are discharged at well-graded fiber outlet 118 along with the associated mineral material being mostly calcium carbonate that had been employed to construct the carpet backing. The mineral material, having also traversed the granulator, is now a well-graded aggregate. In another embodiment of the granulator, the well-graded fibers only are discharge from outlet 118 and the mineral aggregate from outlet 119.

Subsequent figures provide the basis for descriptions of the processes by which the well-graded fiber is employed in the formation of products employing or based on congealable materials.

With reference to FIG. 2, aggregate such as crushed rock, sand, crushed waste concrete, cinders etc. are stored in source 20 and dispensed and metered via metering device 24 through conduit 22 to mixer 38.

Well-graded or reformed fiber in any form, such as loose, bagged or pelletized, is dispensed to mixer 38 from source 26 through conduit 28 under control of metering device 30 at the rate of 4 to 20 pounds of reformed fiber per cubic yard of final mix thereby forming a first mixture.

Mixer 38 is caused to operate for an initial time period "A" (see FIGS. 4 and 5 for example) in the range of 30 seconds to 5 minutes. The duration of the initial time period "A" depends on the speed of the mixer and the composition of the constituents being mixed.

After a mixing time "A" during which the fiber in the first mixture has been sufficiently distributed throughout the aggregate, or in the case of fiber in pellet form to release the fibers from the pellet binder, congealable material 34 is dispensed via metering device 35 and conduit 36 into mixer 38 to form the second mixture. After a mixing period "B" (FIGS. 4 and 5), the thoroughly mixed second mixture is dispensed via outlet 40 to application 39.

While the above process has been described in terms of a batch process, the following description relating to FIG. 2 applies equally well to a continuous process. For example, mixer 38 is a long rotating heatable dryer that is pitched in the direction of flow. Aggregate 20 is continuously metered into the entering or high end of the dryer/mixer 38 along with a continuous metered flow of well-graded or reformed fiber, 26, thereby forming a first mixture. As the dryer rotates, the first mixture moves in a stream to a midpoint in the rotating dryer (at time A) where a congealable material such as hot asphalt 80 (FIG. 3) is added via control 84 and conduit 82, thereby forming a second mixture. The stream comprising the second mixture continues moving toward the low end of the dryer while the mixing of the congealable material and the ingredients of the first mixture are thoroughly performed. At the low end of the dryer the thoroughly mixed second mixture is now (Time B) continuously discharged 40 to storage or the application. The continuous process continues until the dispensing of the ingredients in discontinued.

In a second embodiment of the invention the first mixture comprised of fiber and aggregate as described in the first embodiment is, after time A, mixed with congealable material in the form of cementitious powder and water. The cementitous powder, hereafter characterized as cement or cement powder 90 (FIG. 3), is fed into the mixer 38 via control 94 and conduit 92. Water 96 is fed substantially simultaneously with the cement powder 90 into mixer 38 via control 100 and through conduit 98, thereby forming a second mixture. The second mixture is mixed for a sufficient time B to secure the desired mixing of the constituents and then the second mixture is dispensed to the application.

In a third embodiment, also displayed in FIG. 2, the aggregate from 20 is dispensed via conduit 22 to mixer 38 substantially simultaneously with reformed or well-graded fiber, in any form, from source 26 dispensed via conduit 28 and the cement powder from source 90 via conduit 92 and metered by element 94 thereby forming a first mixture. The first mixture is then mixed in mixer 38 for a time period A during which the reformed fiber is disrupted and mixed with other constituents and the cement is distributed throughout the first mixture. Water, now being the congealable material, is added via conduit 98 from source 96 through metering device 100, thereby forming the second mixture. The second mixture is then mixed for a period B and dispensed to the application.

Basically there are three possible sequences of adding ingredients to the mixer. First is adding aggregate and fiber to form the first mixture. The second is adding aggregate and congealable materials to form the first mixture. The third is adding fiber and congealable materials to form the first mixture. In each case the first mixture is mixed and blended in the mixer and after a time A the third ingredient is added and mixed for a time B. These three options are displayed in FIGS. 4 and 5.

Where the congealable material is glue used to join laminates (FIG. 5), generally no aggregate is employed. Then the glue is fed to the mixer 38 via conduit 103, under the control of controller 102. The well-graded fiber 26 is added. With reference to FIG. 5, the time A may be short or zero. The glue-type materials are mixed and after sufficient time B for uniform distribution of the fibers throughout the glue, the material is extruded, formed or otherwise applied 40 to its application.

From the foregoing description, it can be seen that the present invention comprises an unusual and unobvious method for minimizing the deposition of waste carpets and waste textiles in land fills and simultaneously improving the quality of structural material. It will be appreciated by those skilled in the art that changes could be made to the embodiments described in the foregoing description without departing from the broad inventive concepts thereof. It is understood, therefore, that this invention is not limited to the particular embodiment or embodiments disclosed, but is intended to cover all modifications which are within the scope and spirit of the invention as claimed and equivalents thereof.

I claim:

1. A process for providing and inserting well-graded fiber reinforcement into congealable materials said process comprising the steps of:
   a. comminuting carpet to produce well-graded fiber and an associated well-graded granular mineral material;
   b. providing congealable material that contains cement powder and water;
   c. providing aggregate;
   d. providing mixing means;
   e. mixing said aggregate with said water and said cement powder in said mixing means for a mixing period;
   f. dispensing said well-graded fiber into said mixing means after said mixing period;

g. and mixing together said well-graded fiber, said cement powder, said aggregate and said water until said well-graded fiber is substantially uniformly distributed.

2. A process as recited in claim 1 wherein said step of comminuting carpet includes at least one of shredding and granulating said carpet.

3. A process as recited in claim 1 further including the step of separating said well-graded fiber from said granular mineral material prior to said step of mixing together.

4. A process as recited in claim 1 further including the step of providing that at least a portion of said granular mineral material is included with the well-graded fiber during mixing of the well-graded fiber with the congealable material.

5. A process for providing and inserting well-graded fiber reinforcement into a concealable material, comprising the steps of:
   a. comminuting carpet to produce well-graded fiber and an associated well-graded granular mineral material;
   b. providing congealable material containing cement powder and water;
   c. providing aggregate;
   d. providing mixing means;
   e. dispensing said well-graded fiber, said cement powder, said aggregate and said water into said mixing means substantially simultaneously;
   f. and mixing together said well-graded fiber, said cement powder, said aggregate and said water until substantially uniformly distributed.

6. A process for providing and inserting well-graded fiber reinforcement into a congealable material, comprising the steps of:
   a. comminuting carpet to produce well-graded fiber and an associated well-graded granular mineral material;
   b. providing congealable material containing cement powder and water;
   c. providing aggregate;
   d. providing mixing means;
   e. mixing said well-graded fiber and said aggregate in said mixing means and mixing for a mixing period;
   f. adding said cement powder and water to said mixing means after said mixing period; and
   g. mixing together said well-graded fiber, said cement powder, said water and said aggregate until substantially uniformly distributed.

7. A process for providing and inserting well-graded fiber reinforcement into an asphalt composition, comprising the steps of:
   a. comminuting carpet to produce well-graded fiber and an associated well-graded granular mineral material;
   b. providing congealable material containing hot liquid asphalt;
   c. providing aggregate;
   d. providing mixing means;
   e. mixing said well-graded fiber and said aggregate in said mixing means for a mixing period; and
   f. adding said hot liquid asphalt to said mixing means after said mixing period and mixing said hot liquid asphalt, said aggregate and said well-graded fiber together until substantially uniformly distributed.

8. A process for providing and inserting well-graded fiber reinforcement into an asphalt composition, comprising the steps of:
   a. comminuting carpet to produce well-graded fiber and an associated well-graded granular mineral material;
   b. providing congealable material containing hot liquid asphalt;
   c. providing aggregate;
   d. providing mixing means;
   e. mixing said hot liquid asphalt and said aggregate in said mixing means for a mixing period; and
   f. adding said well-graded fiber to said mixing means after said mixing period and mixing said hot liquid asphalt, said aggregate and said well-graded fiber together until substantially uniformly distributed.

\* \* \* \* \*